Aug. 15, 1933.  J. W. PEASE  1,922,745

FEEDING MECHANISM FOR FRUIT PARING MACHINES

Filed Dec. 26, 1929   3 Sheets-Sheet 1

*Fig.1*

INVENTOR
John W. Pease
BY
his ATTORNEY

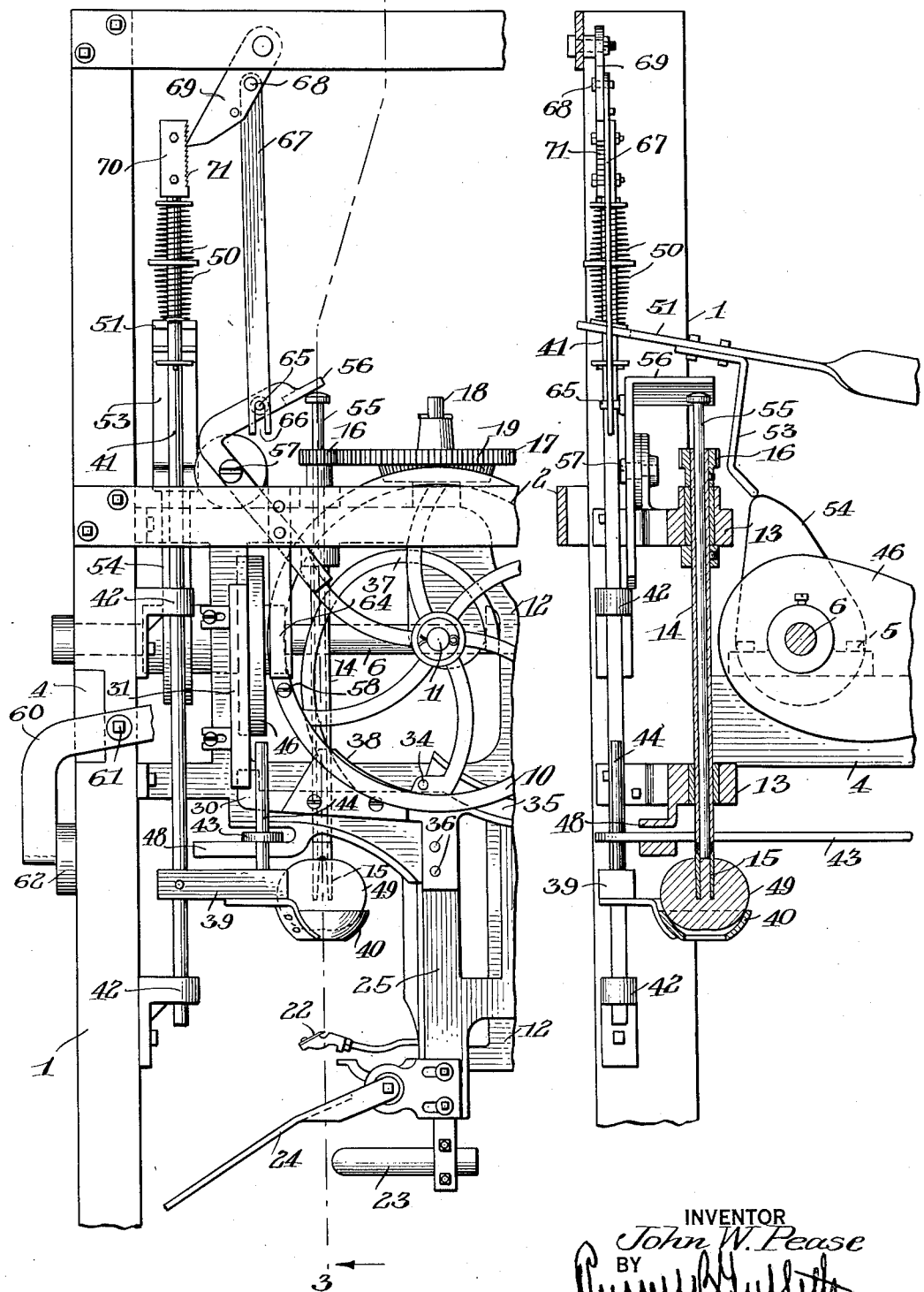

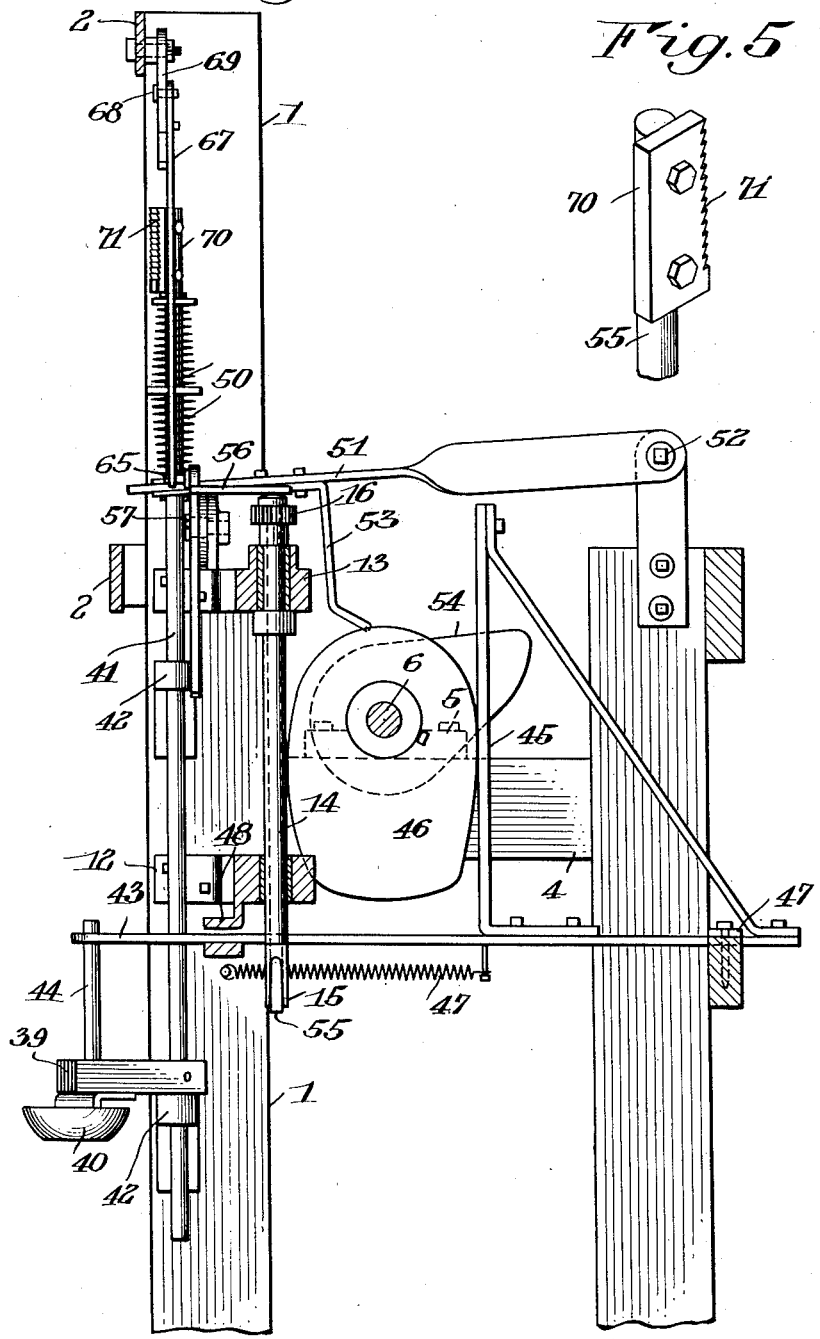

Patented Aug. 15, 1933

1,922,745

UNITED STATES PATENT OFFICE 1,922,745

FEEDING MECHANISM FOR FRUIT PARING MACHINES

John W. Pease, Rochester, N. Y.

Application December 26, 1929
Serial No. 416,466

4 Claims. (Cl. 146—51)

My present invention relates to fruit paring machines and particularly to apple paring machines of the nature shown in my reissue Letters Patent of the United States, No. 17,307, dated May 28, 1929, and entitled Apple paring machine, to which reference is made, and it has for its object to render such paring machines adaptable to uniform work upon apples of different sizes and apples of different degrees of firmness though the same automatic or mechanical feeding mechanism is used for all, thereby eliminating waste, or, at least reducing it and further obviating the necessity of setting up differently adjusted machines for different grades of fruit or using a plurality of machines.

To these and other ends, the invention resides in certain improvements and combinations of parts, all as will be hereinafter more fully described, the novel features being pointed out in the claims at the end of the specification.

In the drawings:

Fig. 1 is a front elevation, partly broken away, of an apple paring machine having a feeding mechanism constructed in accordance with and illustrating one embodiment of my invention;

Fig. 2 is a similar view constituting a fragment of the showing of Fig. 1, but illustrating the parts in another position;

Fig. 3 is a fragmentary section taken on the line 3—3 of Fig. 2;

Fig. 4 is a vertical section taken on the line 4—4 of Fig. 1, and

Fig. 5 is a detailed enlarged perspective view of the ratchet used in the stop mechanism.

Similar reference numerals throughout the several views indicate the same parts.

As above stated, my invention is applicable to paring machines provided with feeding mechanism such as disclosed in my prior patent above mentioned, and while features of the present improvement are widely applicable to paring machines and feeding mechanisms therefor, in general, I will explain it in connection with the structure shown in that patent, the same being illustrated in the present drawings.

To first give a general idea of the main elements and mode of operation of the entire machine, it comprises a parer of somewhat the usual type except that it is arranged vertically instead of horizontally, that is, the paring fork rotates on a vertical axis and the corer and parer also, therefore, move vertically. It is a single fork machine and the fork has a fixed position except for its rotation. A horizontally swinging feeding cup moves outwardly or forwardly to a position convenient to the operation when receiving the apple which is placed therein by hand. The feeding cup then swings inwardly or rearwardly beneath the fork; upwardly to impale the apple upon the fork and then quickly moves downwardly and outwardly so as to clear the coring and paring elements that immediately thereafter start to operate upon the fruit. All of these movements are conducted in timed relation from a single drive shaft through the use of an interrupted gear, cams and springs all as hereinafter described.

Referring more particularly to the drawings, 1 indicates the uprights of a rectangular frame having cross pieces or rails 2. Just below the top rails 2 are side rails 4 running from front to rear upon which are supported the bearings 5 of a drive shaft 6. This drive shaft is preferably power driven though a hand crank may of course be used.

It will perhaps be well to describe the parer proper first irrespective of the feeding mechanism.

Fixed to the shaft 6 is a main driving gear 9. This is an interrupter gear meshing with a gear 10 on a shaft 11 which runs from front to rear of the machine. It is a stud shaft carried by an inner frame 12 that supports the parer proper. The frame 12 is also provided with bearings 13 to carry a fixed shaft 14 having at its lower end a fork 15. All of the paring is done on this single fork. At the upper end of the shaft is a spur 16 by which it is driven from a gear 17 mounted on a vertical stud 18 on the frame 12. Below and fixed to the gear 17 is a bevel gear 19 that meshes with the gear 10. It having been stated that the main driving gear 9 is an interrupter gear, it will be seen that continuous rotation of the drive shaft 6 intermittently rotates the fork shaft 14.

To insure the meshing of the teeth on the interrupted driving gear 9 with the continuous gear 10 upon each cycle of the machine, the gear 10 is provided with a pin 20 which is kicked at the proper time by a projecting abutment 21 on the driving gear 9.

The paring knife 22, corer 23, and doffer 24 operate as usual and will, therefore, not be described in any great detail. They are carried on a vertically reciprocating frame 25 having at one side a guide rod 26 that slides in fixed bearings 27 in the frame 12. The frame 25 is fixed to this guide rod 26 by means of the lugs 28 and connected to the lower end of the rod 26 is a counter-balancing spring 29 the upper end of which is connected to the frame 1 and the function of which is to break the fall of the frame 25 inasmuch as the parer is operating vertically instead of in the usual horizontal direction. On the opposite or left hand side of the frame 25 is a lug 30 which slides in a guide 31 on the frame 12. As the frame 25 moves upwardly, the knife 22 is carried into paring engagement with an apple on the fork 15 through the action of suitable cams on the frame 12 (not shown), all as usual, while the corer 23 by a similar cam action, swings up from the position of Fig. 2 to that of Fig. 4. These movements and operations of the corer and the paring knife are the usual ones and as they have nothing to do with the present invention, a more detailed description than the above is thought not to be warranted. The corer 23 swings upwardly and downwardly through the forked doffer 24. As the frame 25 descends and the corer 23 brings down the cored apple from the fork 15, the apple is disengaged by the doffer 24 which is fixed to the frame 25 at an angle and the apple is discharged.

The upward movement of the frame 25 to carry the paring knife 22 and corer 23 into operation with respect to an apple placed on the fork 15 in the manner hereinafter described is accomplished, initially, by the engagement of a pin 34 on the gear 10 with a cam track 35 on the frame 25. As soon as the said pin leaves the right hand end of this cam track, a pair of pins 36 on the frame engage on opposite sides of a spiral cam 37 projecting from the inner side of the gear 10. By the time these pins 36 reach the inner end of this cam 37 and free themselves, both the corer and paring knife have done their work and the frame 25 is as high as it has occasion to go. The frame immediately drops by gravity except for the check of the counter-balancing spring 29 with the consequent retracting movements of the paring knife 22 and corer 23 and the doffing of the apple. To insure a completion of this downward movement, however, the frame 25 is provided with a cam 38 which is engaged by the same pin 34 that thereafter cooperates with the track cam 35 previously described.

The feeding device comprises an arm 39 carrying a cup 40 and mounted upon a rod 41 which has a bearing in brackets 42 on the frame 1 in which it pivots and in which it is also slidable vertically. The pivotal movement of this arm 39 and feed cup 40 is for the purpose of carrying the cup from the receiving position of Fig. 4 to the delivering position of Figs. 2 and 3 beneath the fork 15. When in the receiving position of Fig. 4, the operator, standing at the front of the machine, places an apple in the cup 40. The latter is then immediately drawn to a position beneath the stationary fork 15. This is accomplished by means of a pull rod 43 which is connected to a sliding pivot 44 on the arm 39. The pull rod 43 is provided with a vertical abutment 45 that is engaged by a cam 46 on the drive shaft 6. This cam draws the arm 39 and cup 40 inwardly and the latter into alignment with and beneath the fork 15 against the tension of a spring 47 connected to the frame 1 and to the pull rod 43, the tendency of which spring is to throw the feed cup 40 to the receiving position of Fig. 4. The pull rod 43 is guided in a strap 47 on the frame 1 and also in a guide 48 in the frame 12.

After the feeding cup 40 has been swung in this manner into a position below the fork 15 with an apple contained therein as indicated at 49, it is necessary to give it a vertical reciprocatory motion, that is, to carry it upwardly and impale the apple on the fork. This is accomplished through a vertical sliding movement of the pivot rod 41 in the brackets 42. The upper end of the rod 41 is engaged beneath a pair of adjustable springs 50 by the forked end of a lever 51 extending from front to rear of the machine. It is pivoted at 52 at the rear of the machine and has an arm 53 that rides on a cam 54 on the drive shaft 6. This cam is so shaped as to raise the lever 51 abruptly and then abruptly drop it so that the up and down movement of the feed cup 40 is very rapid. Its action is this: After receiving the apple it is swung by the cam 46 to a position in alignment with and beneath the fork 15 while the knife 22 and corer 23 are down; it then moves upwardly and impales the apple on the fork as shown in Fig. 2; its next movement is a rapid drop as the arm 53 falls off of the high point of the cam 54. Immediately thereafter and before the knife and corer have a chance to rise, the feed cup swings forwardly again under the influence of its spring the abutment 45 having been released from the high point of cam 46. Thus, another apple can be placed in the cup while the paring operation is being conducted on its predecessor.

The pivot 44 by means of which the draw rod 42 is connected to the arm 39 is a long pivot and has a vertical sliding movement in the arm to permit the impaling of the apple as above described.

A bell crank lever 60 is pivoted to the frame at 61 and has one end normally held against a rubber buffer 62 by a spring 63. The other end is in the path of a pin 58 on the gear 10. Just as the parer carriage 25 reaches its downward position, and the toothed portion of the driving gear 9 moves out of mesh with the gear 10, the pin 58 engages this lever 60 which gives sufficient yielding resistance to prevent it from overrunning, that is, it holds it in position while the blank portion of the driving gear 9 is passing the gear 10. To prevent a re-bound of the gear 10 upon the descent of the carriage, there is also provided a spring latch 64 under which the pin 58 rides, this latch being secured to the cross piece 2 of the main frame 1. When the driving gear 9 again picks up the gear 10, the lever 60 yields and the pin 58 rides off the end thereof.

The fork shaft 14 is a hollow shaft and contains a push rod 55 which is raised as shown in Fig. 2 when the apple is impaled upon the fork as it ordinarily projects between the tines of the fork. The upper end of this push rod projecting from the spur 16 is engaged by a bell crank lever 56 pivoted at 57 to the frame. After the paring operation the pin 58 on the gear 10 engages this lever and causes it to push the rod 55 downwardly and eject the core from the apple after the corer 23 has swung out of the way.

In the practice of my present invention, I utilize the push rod or ejector 55 to effect another function.

One of the greatest difficulties heretofore experienced in the operation of automatic or mechanical feeding mechanism for paring machines is that the feeder makes uniform movements in a given path treating each apple alike regardless of whether it is large or small, soft or firm. A proper impaling engagement of an apple with the fork is one in which the tines of the latter sink in to the center of the apple to their full depth but no farther. This properly holds a sound apple, large or small, and holds a soft apple as well as it can be held—for instance, one partly rotted at the core. Further movement is obviously injurious, being apt to split a sound apple, particularly green, because of its very hardness and having a tendency when the fork rotates to merely bore a hole in a soft apple without rotating it against the resistance of the knife. Of course, the actuation of raising of the feeder rod 44 by the lever 51 through the springs 50 operates to some extent to relieve this condition, but unless frequent adjustments in or changes of the springs are resorted to, they are not effective to meet all of the conditions aforesaid.

I have met this problem in the present improvements by providing a gauge and stop mechanism controlling the impaling movement of the fruit holder 40 and actuated by the apple being carried therein, so that whether large or small, soft or sound, the apple will be thrust on to the fork to a predetermined depth only, that is, preferably the depth of the tines. In doing this, I utilize the push rod and core ejector 55 to function as a gauge that actuates the stop device, that halts the feeder carriage. As appears in Fig. 1, the lower end of the rod projects through the core normally and as the apple approaches the latter. When the apple is impaled, as shown in Fig. 2 (where it is shown properly impaled), it pushes the rod 55 out and rocks the bell crank lever 56 upwardly. On this bell crank is a pin 65 taking into the slotted or forked end 66 of a connecting rod 67 pivoted at 68 to a pawl or stop element 69. At the upper end of the rod 55, I provide a ratchet plate 70 having ratchet teeth 71 thereon, as shown in detail in Fig. 5. When the fruit holder 40 is in receiving position or in the forward position toward the operator, as shown in Figs. 1 and 4, the ratchet teeth 71 are faced forwardly, as shown in these views. As the fruit holder swings into alignment with the fork, the teeth are faced toward the stop pawl 69, as shown in Fig. 2. As soon as the feeder has raised sufficiently to properly impale the apple, as before described, and has raised the rod 55 correspondingly, the latter actuates the stop mechanism as stated through the lost motion connection 65—66, and quickly throws the stop 69 into engagement with one of the teeth of the ratchet plate, halting further upward movement of the feed holder, positively. Further movement of the actuating mechanism, such as the lever 51, is absorbed in the springs 50 and with this stop mechanism a nice regulation of the tension of the springs is not required.

It will thus be seen that the feeder will move a greater or less distance according to the size of the apple, regardless of whether it is large or small, soft or otherwise, because it is the upper or contacting surface of the apple that controls the mechanism to throw in the stop, which mechanism is therefore rendered insensitive to the diameter of the apple. Of course, with the return of the fruit holder to receiving position, the ratchet plate is withdrawn from the pawl and also the pawl is released from it when the feeder drops and the bell crank moves downwardly for the coring operation.

I claim as my invention:

1. In a paring machine, the combination with a rotary fork and a feeding device embodying a non-yielding fruit holder adapted to move toward and from the fork and to impale a fruit thereon, of an actuator for the feeding device, a spring through which the actuator imparts impaling movement thereto, a positive stop for the feeding device and fruit holder, and a gauge adapted to be actuated by the fruit and controlling the stop.

2. In a paring machine, the combination with a rotary fork and a feeding device embodying a reciprocatory rod having a non-yielding fruit holder thereon adapted to move toward and from the fork to impale a fruit thereon, of an actuator for the rod, a spring through which the actuator imparts impaling movement thereto, a positive stop for the rod, and a gauge adapted to be actuated by the fruit and controlling the stop.

3. In a paring machine, the combination with a rotary fork and a feeding device embodying a reciprocatory rod having a fruit holder thereon adapted to move toward and from the fork to impale a fruit thereon, of an actuator for the rod, a spring through which the actuator imparts impaling movement thereto, a swinging stop adapted to positively engage the rod, and a gauge embodying a push rod associated with the fork in each instance to lie in the path of a fruit as it is impaled upon the latter so as to be actuated by the fruit to move the stop to operative position.

4. In a paring machine, the combination with a rotary fork and a feeding device embodying a reciprocatory rod having a fruit holder thereon adapted to move toward and from the fork to impale a fruit thereon and to swing upon the axis of the rod into and out of alinement with the fork, of an actuator for the rod, a spring through which the actuator imparts impaling movement thereto, a movable stop adapted to positively engage the rod, the latter being provided with a swinging abutment for cooperation with the stop, and a gauge embodying a push rod associated with the fork in parallelism to the first mentioned rod in each instance to lie in the path of a fruit as it is impaled upon the latter so as to be actuated by the fruit to move the stop to operative position.

JOHN W. PEASE.